(12) United States Patent
Okazaki et al.

(10) Patent No.: US 8,514,316 B2
(45) Date of Patent: Aug. 20, 2013

(54) IMAGE DEVICE AND OPTICAL DEVICE FOR PROVIDING DUST REMOVING CAPABILITIES

(75) Inventors: Mitsuhiro Okazaki, Saitama (JP); Kosuke Okano, Yokohama (JP)

(73) Assignee: Nikon Corporation, Tokyo (JP)

( * ) Notice: Subject to any disclaimer, the term of this patent is extended or adjusted under 35 U.S.C. 154(b) by 538 days.

(21) Appl. No.: 12/289,242

(22) Filed: Oct. 23, 2008

(65) Prior Publication Data

US 2009/0257123 A1 Oct. 15, 2009

Related U.S. Application Data

(60) Provisional application No. 60/996,030, filed on Oct. 25, 2007, provisional application No. 60/996,543, filed on Nov. 23, 2007.

(30) Foreign Application Priority Data

Oct. 26, 2007 (JP) .................................. 2007-278616
Nov. 22, 2007 (JP) .................................. 2007-303292

(51) Int. Cl.
*H04N 5/225* (2006.01)
*G02F 1/00* (2006.01)

(52) U.S. Cl.
USPC .......................... 348/340; 348/342; 359/321

(58) Field of Classification Search
USPC .................. 348/340, 342; 359/321, 495, 497, 359/500; 396/354–359
See application file for complete search history.

(56) References Cited

U.S. PATENT DOCUMENTS

| | | | |
|---|---|---|---|
| 2004/0012714 A1* | 1/2004 | Kawai | 348/374 |
| 2004/0080659 A1* | 4/2004 | Iwane et al. | 348/342 |
| 2005/0179786 A1* | 8/2005 | Korenaga et al. | 348/218.1 |
| 2008/0019686 A1* | 1/2008 | Inukai et al. | 396/529 |
| 2008/0049136 A1* | 2/2008 | Ishibashi | 348/333.09 |

FOREIGN PATENT DOCUMENTS

| | | |
|---|---|---|
| JP | A-3-103820 | 4/1991 |
| JP | A-2000-327492 | 11/2000 |
| JP | A-2003-319222 | 11/2003 |
| JP | A-2003-324317 | 11/2003 |
| JP | A-2003-338961 | 11/2003 |
| JP | A-2004-246261 | 9/2004 |
| JP | A-2005-20078 | 1/2005 |
| JP | A-2006-71851 | 3/2006 |

(Continued)

OTHER PUBLICATIONS

Nihon Dempa Kogyo Co., Ltd., *Crystal Units*.

(Continued)

*Primary Examiner* — Kelly L Jerabek
(74) *Attorney, Agent, or Firm* — Oliff & Berridge, PLC

(57) ABSTRACT

An imaging device comprises a quartz crystal plate including a quartz crystal of crystal structure having a first axis and a second axis vertical to the first axis, said quartz crystal plate being provided as facing to an image pickup element taking an image from an optical system, and a vibration member provided on a surface of said quartz crystal plate crossing an optical axis of said optical system so as to vibrate said quartz crystal plate, wherein;

an angle of the face of said quartz crystal plate crossing the optical axis of said optical system is substantially +45° rotated counter-clockwise around said second axis from said first axis viewing from said second axis.

18 Claims, 18 Drawing Sheets

(56) References Cited

FOREIGN PATENT DOCUMENTS

| | | |
|---|---|---|
| JP | A-2007-142952 | 6/2007 |
| JP | A-2007-267189 | 10/2007 |
| JP | A-2007-274663 | 10/2007 |
| WO | WO 03/107073 A1 | 12/2003 |

OTHER PUBLICATIONS

Translation of Aug. 8, 2012 Office Action issued in Japanese Patent Application No. 2008-274875.

* cited by examiner

FIG. 15

| | | |
|---|---|---|
| ELASTIC COEFFICIENT $C_{ij}^E$ | $C_{11}$ | $2.030 \times 10^{11} N/m^2$ |
| | $C_{12}$ | $0.573 \times 10^{11} N/m^2$ |
| | $C_{13}$ | $0.752 \times 10^{11} N/m^2$ |
| | $C_{14}$ | $0.085 \times 10^{11} N/m^2$ |
| | $C_{33}$ | $2.424 \times 10^{11} N/m^2$ |
| | $C_{44}$ | $0.595 \times 10^{11} N/m^2$ |
| | $C_{66}$ | $0.7285 \times 10^{11} N/m^2$ |

IMAGE DEVICE AND OPTICAL DEVICE FOR PROVIDING DUST REMOVING CAPABILITIES

BACKGROUND OF THE INVENTION

1. Field of the Invention

The present invention relates to an imaging device and an optical device.

2. Description of the Related Art

In recent years, in a lens interchangeable digital camera and the like, there are problems such that dust is shown in a taken image due to accretion of the dust on a surface of a filter of an image pick-up element. In order to solve such problems, a system has been developed wherein an anti-dust member is provided between an image pick-up element and an optical system to ensure dust-prevention for the image pick-up element and filters as well as removing the attached dust on the anti-dust member by vibration (refer to JP Patent Publication No. 2003-338961).

However, according to conventional systems, since the anti-dust member is a circular shape, for covering the image pick-up element, an anti-dust member having large size is necessary which is contrary to a requirement for downsizing of the image pick-up device.

Also, according to conventional systems, a piezoelectric element to vibrate the anti-dust member is attached on a surface of an image pickup element side. Therefore, dust raised from the piezoelectric element itself is adhered to an optical filter and the like arranged between the anti-dust member and the image pickup element, a problem of difficulty to remove the dust is concerned too.

SUMMARY OF THE INVENTION

The present invention has been made due to considering these circumstances, a purpose of the invention is to provide an imaging device and an optical device comprising the imaging device having an excellent dust removing capability.

In order to achieve the above purpose, an imaging device of a first aspect of the present invention comprises, a quartz crystal plate including a quartz crystal of crystal structure having a first axis and a second axis vertical to the first axis, said quartz crystal plate being provided as facing to an image pickup element taking an image from an optical system, and a vibration member provided on a surface of said quartz crystal plate crossing an optical axis of said optical system so as to vibrate said quartz crystal plate, wherein;

an angle of the face of said quartz crystal plate crossing the optical axis of said optical system is substantially +45° rotated counter-clockwise around said second axis as a center axis from said first axis viewing from said second axis.

In the imaging device according to the first aspects of the present invention, the quartz crystal plate can be used as a part of an optical filter which contributes to reduce number of components and an apparatus to be compacted, because newly added members for dust removal are not necessary.

A quartz crystal plate having a surface of an angle is substantially +45° to the first axis includes different an elastic modulus, low bending rigidity and its resonance frequency is substantially 20% lower, as compared from a quartz crystal plate having a surface of an angle substantially −45° around to the first axis. Therefore, the quartz crystal plate of the present invention can be bent easily and includes high dust removability.

Also, for example, it is preferable to make the quartz crystal plate is a rectangular shape. In this case, since an image pickup face of the image pickup element is a rectangular shape, it contributes that an apparatus to be compacted due to a space that the quartz crystal plate for the dust prevention is small, compared from a circular shape glass.

A second imaging device according to the present invention comprises an optical member having an optical anisotropy property provided to face an image pickup element taking an image by an optical system, and a vibration member provided at a face of said optical member crossing an optical axis of said optical system so as to vibrate said optical member.

In the imaging device according to the second aspect of the present invention, the optical member including optical anisotropy can be used as a part of an optical filter which contributes to reduce number of components and an apparatus to be compacted, because newly added members for dust removal are not necessary.

An imaging device according to a third aspect of the present invention comprises;

an image pickup element which takes an image, a transparent member provided as facing to said image pickup element, a vibration member provided at said transparent member so as to vibrate said transparent member, and a ultraviolet curable epoxy adhesive which fixes said vibration member on said transparent member.

Also, for example, an imaging device according to the present invention comprises;

an image pickup element which takes an image, a transparent member provided as facing to said image pickup element, a vibration member provided at said transparent member so as to vibrate said transparent member, and a cationic polymerization type ultraviolet curable adhesive which fixes said vibration member on said transparent member.

A method for manufacturing an imaging device of the present invention comprises steps of;

providing a vibration member which vibrates a quartz crystal plate at a face crossing an optical axis of a rectangular quartz crystal plate including a quartz crystal having crystal structure including a first axis which is a crystal growth axis and a second axis which is an electric axis perpendicular to said first axis, and arranging said quartz crystal plate so as to face an image pickup element taking an image from said optical system.

An optical device according to the present invention is an optical device comprising the above mentioned imaging device which is not limited to a still camera and a video camera, and includes optical devices such as a microscope, mobile phone and the like.

BRIEF DESCRIPTION OF THE DRAWINGS

Below, the present invention will be specified based on embodiments shown in drawings.

FIG. 15 shows relation of a direction of an optical anisotropic plate and an elastic modulus.

FIRST EMBODIMENT

Figure 1:
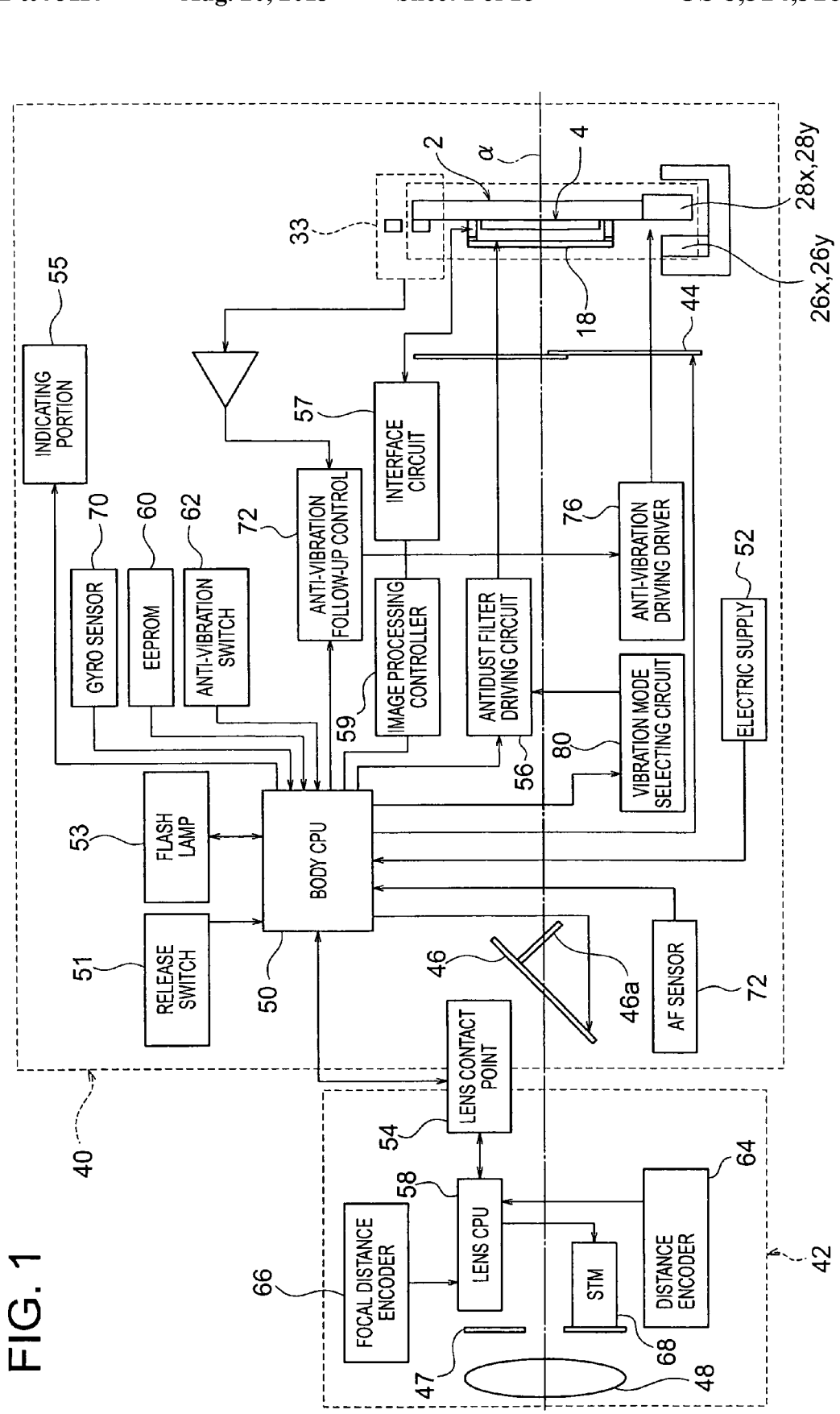
FIG. 1 is a block diagram of a whole camera according to one embodiment of the present invention.

First, a whole constitution of a camera of the present embodiment will be specified. A blurring compensation device 2 having an image pickup element unit 4 is arranged at an inside of a camera body 40 as a quartz crystal plate 18 of the image pickup element unit 4 being crossing substantially perpendicular to an optical axis α of optical lens group 48. With respect to the quartz crystal plate 18, it will be mentioned below.

As shown in FIG. 1, a lens barrel 42 is equipped detachably to the camera body 40. Note that in compact camera and the like, there are a camera in which the lens barrel 42 and the camera body 40 are integral, and in the present invention, types of camera are not limited particularly. Also, it can be applied to not only a still camera, but also optical devices such as a video camera, a microscope, mobile phone and the like. In following explanation, for making explanation easily, it will be explained about a single lens reflex camera in which the lens barrel 42 and the camera body 40 are detachable.

In the camera body 40, a shutter member 44 is arranged in front of an optical axis α direction of the image pick-up unit 4. A mirror is arranged in front of the an optical axis α direction of the shutter member 44, and a diaphragm portion 47 and an optical lens group 48 contained within the lens barrel 42 are arranged in front of the an optical axis α direction thereof.

A body CPU 50 is contained within the camera body 40 and is connected to a lens CPU 58 via a lens contact 54. The lens contact causes electrically connecting the body CPU 50 and the lens CPU by connecting the lens barrel 42 with the cameral body 40. A power supply 52 is connected with the body CPU 50. The power supply is contained within the camera body 40.

A release switch 51, a flash lamp 53, an indicating portion 55, a gyro sensor 70, EEPROM (memory) 60, an anti-vibration switch 62, an antidust filter driving circuit 56, an image processing controller 59, AF sensor 72, an anti-vibration follow-up control IC 74 and the like are connected to the body CPU 50. The image pick-up element 12 of the image pick-up element unit 4 (refer to FIG. 2 to FIG. 4) is connected with the image processing controller 59 via an interface circuit 57, and the image controller 59 enables to control an image processing taken by the image processing pick-up element 12. The image pickup element 12 is composed of, for example, a solid-state image pickup element such as CCD and CMOS and the like.

The body CPU 50 comprises a communication function with the lens barrel 42 and a control function of the camera body 40. Also, the body CPU 50 outputs an anti-vibration driving portion target point to the anti-vibration follow-up control IC 74. The anti-vibration driving portion target point is calculated from information input from EEPROM 60, a blurring angle calculated by receiving an output from the gyro sensor 70, focal distance information and distance information. Also, a blurring angle is derived by the body CPU 50 by inputting a sensor output through an amplifier not shown in figures to the body CPU 50 and integrating an angular velocity of the gyro sensor 70.

Also, the body CPU conducts a communication whether the lens barrel 42 is equipped completely, and calculates a target position from a focal distance, distance information input from the lens CPU 58 and the gyro sensor. When a release switch 51 is pressed halfway, the body CPU outputs a command for operation of preparing to capture an image such as vibration control driving and the like in response to conditions of AE, AF to the lens CPU 58 and the vibration follow-up control IC 74. When the release switch is fully pressed, the body CPU outputs commands for mirror drive, shutter drive, diaphragm drive and the like.

The indicating portion 55 is composed of, mainly, a liquid crystal display device and the like, which displays output results, menu and the like. The release switch 51 is a switch for operating timing of shutter driving, which outputs a condition of the switch to the body CPU 50. When the release switch 51 is pressed halfway, body CPU 50 operates AF, AE and anti-vibration driving depending on a situation. When the switch is fully pressed, it operates mirror-up, shutter drive and the like.

The mirror 46 is for showing an image to a finder at decision of picture composition, which eliminates from an optical line during exposure. Information of the release switch 51 is input from the body CPU 50 which operates mirror-up when it is fully pressed and mirror down after exposure is finished. The mirror 46 is driven by a mirror driving portion (for example, DC motor) which is not shown in figures. A sub-mirror 46a is connected with the mirror 46.

The sub-mirror 46a is a mirror for transmitting light to an AF sensor which introduces light beam through the mirror to the AF sensor by reflection. The sub-mirror 46a eliminates from the optical line during exposure.

A shutter member 44 is a mechanism to control an exposure time. Information of the release switch 51 is input from the body CPU 50, when the switch fully pressed, the shutter member 44 operates shutter driving. The shutter member 44 is driven by a shutter driving portion (for example, DC motor) which is not shown in figures.

The AF sensor 72 is a sensor for conducting Auto focusing (AF). As the AF sensor, normally, a CCD is used. An anti-vibration switch 62 outputs anti-vibration ON or OFF status to the image pick-up element unit CPU. The gyro sensor 70 detects angular velocity of blurring occurred at the body and outputs to the body CPU 50. The EEPROM 60 comprises information such as gain value and angle adjustment value of the gyro sensor and outputs them to the body CPU.

Figure 2:
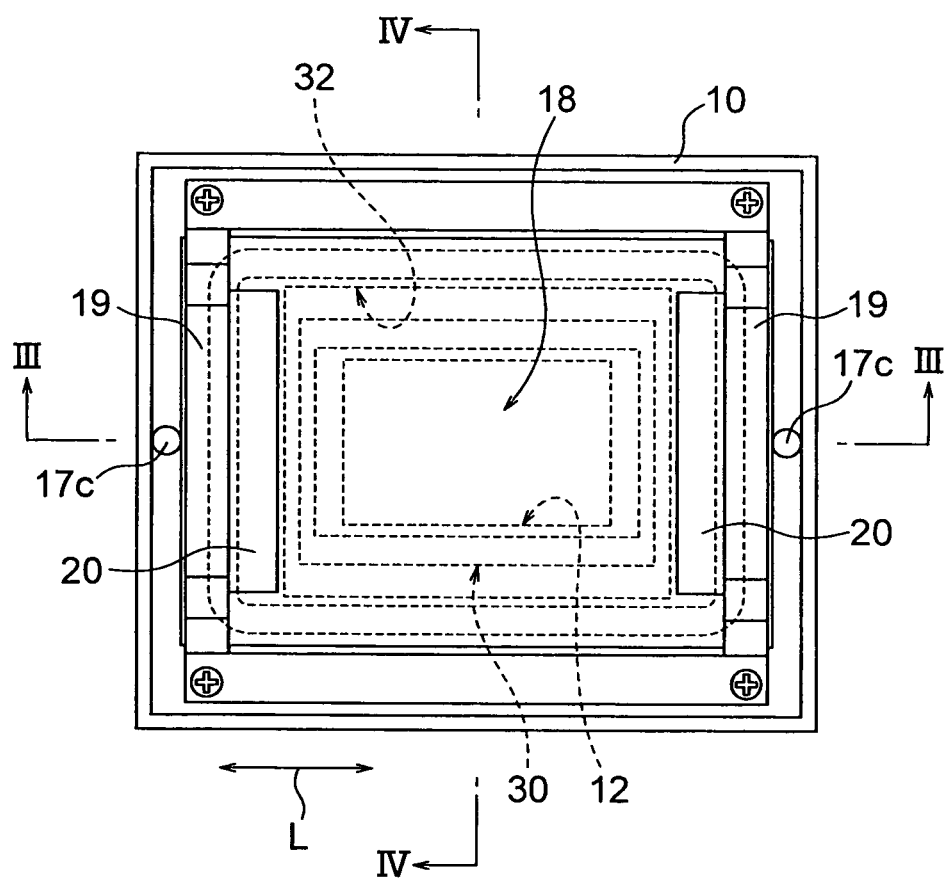
FIG. 2 is a plain view of the imaging device shown in FIG. 1.
Figure 3:
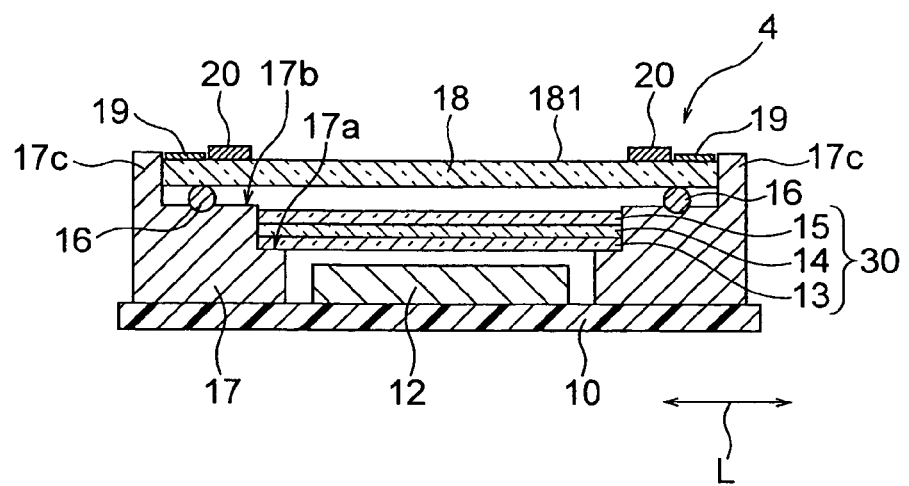
FIG. 3 is a schematic cross sectional view along a line III-III shown in FIG. 2.

The antidust filter driving circuit 56 is connected with the piezoelectric elements 20 shown in FIG. 2 and FIG. 3, and when predetermined conditions are satisfied, the circuit drives the piezoelectric elements 20 so as to vibrate the quartz crystal plate 18, to act an operation for removing dust and the like adhered on the surface 181 of the quartz crystal plate 18 which is substantially vertical to the optical axis α (refer to FIG. 1) of the optical lens group 48, as shown in FIG. 7B to FIG. 7E.

For example, to the piezoelectric elements 20, electric voltage such as periodic rectangular wave or sine wave and the like are applied. In this manner, according to applying periodic electric voltage to the piezoelectric elements 20 by controlling the antidust driving circuit 56, the quartz crystal plate 18 is vibrated. When an inertia force received from the surface of the quartz crystal plate 18 exceeds an adherence of the dust, the dust comes off from the surface of the quartz crystal plate 18.

Preferably, as for the periodic driving of the piezoelectric elements 20, it is preferable to drive the piezoelectric elements 20 with a vibration frequency so as to resonate a surface of the quartz crystal plate 18, in order to obtain preferably large amplitude by low voltage. A resonate frequency is determined by a shape, material, manner of support and vibration mode. It is preferable to support the quartz crystal plate 18 at a node position at which amplitude becomes 0. Supporting structure of the quartz crystal plate 18 will be mentioned below.

In the present embodiment, a vibration mode selecting circuit 80 is connected with the antidust filter driving circuit 56. The vibration mode selecting circuit 80 controls the antidust filter driving circuit 56 via the body CPU 50. Details of control by the vibration mode selecting circuit 80 will be mentioned below The vibration follow-up control IC 74 is IC for vibration control. The IC calculates an anti-vibration driving portion moving amount from an anti-vibration driving portion target point input from the body CPU 50 and an anti-vibration driving portion position information input from a position detecting portion, and outputs the moving amount to an anti-vibration driver 76. Namely, a position signal of the image pick-up element unit from the position sensor 33 and an output signal from the body CPU 50 are input to the anti-vibration follow-up control IC 74. In the body CPU 50, the anti-vibration driving portion target position is calculated from an angle of blurring calculated by receiving an output of the gyro sensor 70, a focal distance information detected by a focal distance encoder, a distance information detected by a distance encoder 64 and the like, and the anti-vibration driving portion target position is output to the anti-vibration follow-up control IC 74.

The anti-vibration driver 76 is a driver for controlling an anti-vibration driving portion to control a driving direction and a driving amount of the anti-vibration driving portion by receiving an input of driving amount from the anti-vibration follow-up control IC. Namely, the anti-vibration driver 76 sends driving current to the coils 28x and 28y based on the input information from the anti-vibration follow-up control IC 74, and causes to move the image pick-up element unit 4 to X-axis and Y-axis directions against the fixed portion 6, and thereby a motion compensation control is made.

In the lens barrel 42 as shown in FIG. 1, the focal distance encoder 66, a distance encoder 64, a diaphragm portion 47, a driving motor 68 for controlling a diaphragm portion 47, the lens CPU 58, a lens contact point 54 with a body portion and a plurality of lens group 48 are equipped. In the lens contact point 54, there are a contact point for supplying a lens driving system power from the camera body 40, a contact point of a CPU power supply for driving the lens CPU 58 and a contact point for digital communication.

The driving system power supply and the CPU power supply are supplied from the power supply 52 of the camera body 40 to provide electric power for the lens CPU 58 and the driving system. The digital communication contact point conducts communication to input digital information output from the lens CPU 58, such as a focal distance, a subject distance and a focal position information and the like to the body CPU 50, and conducts communication to input digital information output from the body CPU 50, such as a focal position information and a diaphragm amount and the like to the lens CPU 58. The lens CPU 58 operates to control AF and diaphragm by receiving the focal position information and the diaphragm amount information from the body CPU 50.

The focal distance encoder 66 determines the focal distance from position information of a zooming lens group. Namely, the focal distance encoder 66 encodes the focal distance and outputs it to the lens CPU.

The distance encoder 64 determines the subject distance from position information of a focusing lens group. Namely, the distance encoder 64 encodes the subject distance and outputs it to the lens CPU.

The lens CPU comprises a communication function with the camera body 40 and a controlling function for the lens group 48. The focal distance and the subject distance and the like are input to the lens CPU, which are output to the body CPU 50 via the lens contact 54. Release information and AF information are input from the body CPU 50 to the lens CPU 58, via a lens contact 54.

Figure 4:
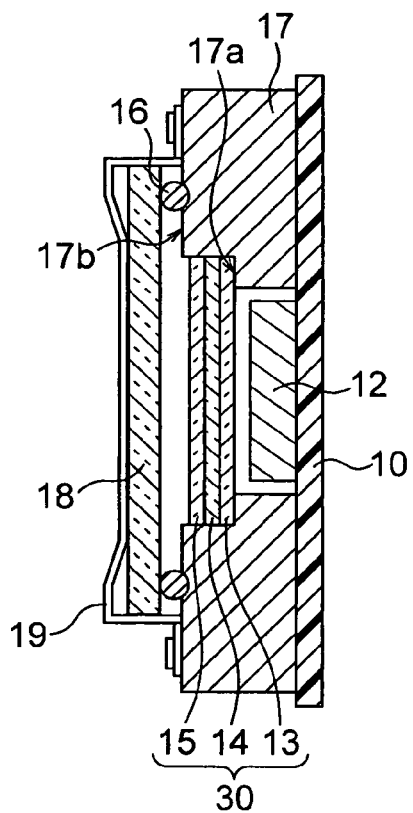
FIG. 4 is a schematic cross sectional view along a line IV-IV shown in FIG. 2.

As shown in FIG. 2 to FIG. 4, the image pickup element unit 4 according to the present embodiment includes a substrate 10, the image pickup element 12 is fixed on an upper face of center portion of the substrate 10. A case 17 is arranged at a circumference of the image pickup element 12 and the case 17 is detachably or not detachably fixed to a surface of the substrate 10.

The case 17 is composed of an insulating body, for example, such as synthetic resin or ceramic and the like, an inner circumferential side attaching portion 17a and an outer circumferential side attaching portion 17b are formed at an upper face thereof in a staircase pattern. An outer circumference of optical member elements 30 having light transmissive property is attached to the inner circumferential side attaching portion 17a. As a result, a circumference of the image pickup element 12 is hermetically sealed by the substrate 10, the case 17 and the optical member elements 30.

The quartz crystal plate 18 is provided at the outer circumferential side attaching portion 17b of the case 17 via a hermitic sealing member 16, and compressed to the hermetic sealing member 16 by a pressing member 19. Here, a metal plate is used as the pressing member 19, the quartz crystal plate 18 is biased to the hermetic sealing member 16 direction by an elastic force due to deformation of the pressing member 19.

As a result, a storage space in which the image pickup element 12 and the optical member elements 30 are provided becomes hermetic sealing, it is possible to prevent insertion of dust from outside of the case 17 to the storage space. The pressing member 19 is detachably fixed on the upper face of the case 17 by, for example, bis fixture, positioning of a long side direction of a rectangular shape quartz crystal plate 18 is made by positioning-pin 17c formed on the upper face of the case 17. Note that, the hermetic sealing member 16 is composed of material having low rigidity, for example, such as formed resin, rubber and the like so as to absorb the vibration movement of the quartz crystal plate 18 which will be mentioned below, with keeping hermetic condition.

In the present embodiment, the optical member element 30 is constituted by a layered structure of a plurality of optical plates which is composed of a layered plate of a quartz crystal plate 13, an infrared ray absorbing glass plate 14 and a quartz crystal wavelength plate ($\lambda$/4 wavelength plates). The optical member element 30 composed of the layered plate has a small area with respect to the quartz crystal plate 18, and further, is a larger area with respect to a plain face side area of the image pickup element 12 so as to cover the whole image pickup element 12.

The quartz crystal wavelength plate 15 is available to change linearly polarized light to circular polarized light, the infrared ray absorbing glass plate 14 has a function to absorb an infrared ray. Also, the quartz crystal plate 13 whose a birefringence direction is different at 90° mutually with respect to the quartz crystal plate 18, in case that one is a quartz crystal plate includes 90° direction birefringence (short side direction), the other quartz crystal plate includes 0° direction birefringence (long side direction). In the present embodiment, the quartz crystal plate 18 includes 0° direction birefringence (long side direction) and the quartz crystal plate 18 includes 90° direction birefringence (short side direction).

Namely, in the present invention, an optical low pass filter (OLPF) is composed basically, by two quartz crystal plate 13 and 18 arranged as spaced each other. Note that, generally, the optical low pass filter is that the infrared ray absorbing glass plate 14 and the quartz crystal wavelength plate 15 are fully layered between the two quartz crystal plates 13 and 18 to compose the optical low pass filter (OLPF).

Figure 5A:
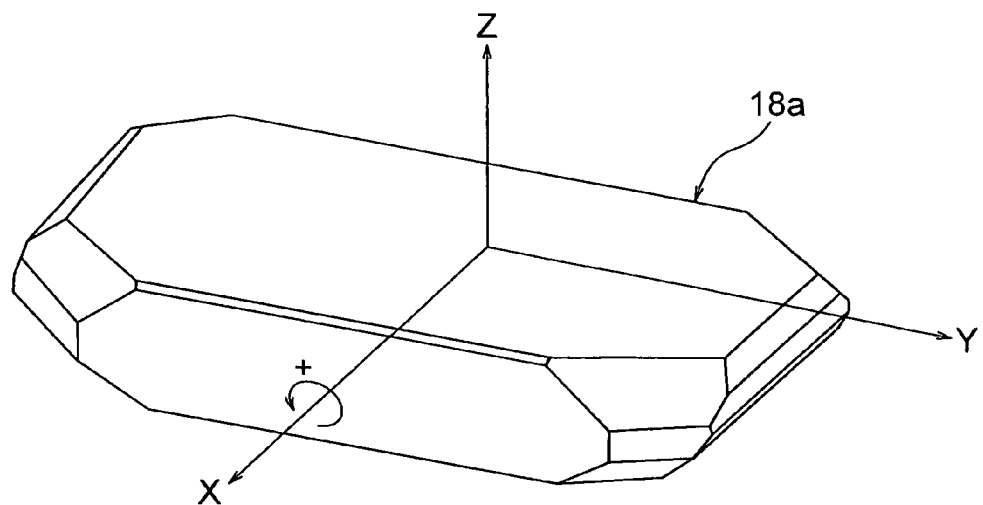
FIG. 5A and FIG. 5B are schematic views for explaining crystal axis of quartz crystal.
Figure 5B:
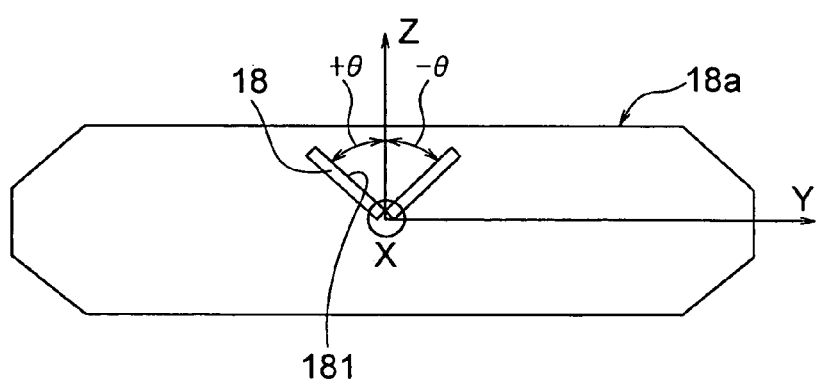

In the present embodiment, the two quartz crystal plates 13 and 18 are arranged as spaced at an inside of the case. Particularly, with respect to the quartz crystal plate 18 arranged at an outer side of the case 17, a quartz crystal plate which is cut out with a specific angle ($\theta$=+45°) from a berg crystal 18a shown in FIG. 5A and FIG. 5B is used. The berg quartz crystal may be artificial quartz crystal or may be natural quartz crystal.

As shown in FIG. 5A and FIG. 5B, a crystal axis of the quartz crystal plate 18 is defined by, for example, a right-handed system of a coordinate axis which comprises an electric axis (X-axis) of the quartz crystal, a machine axis of the quartz crystal (Y-axis) and an optical axis of the quartz crystal (Z-axis). The optical axis of the quartz crystal is a growth axis of the crystal. The electric axis of the quartz crystal is an axis which is vertical to the optical axis of the quartz crystal and through an edge line which is parallel to the optical axis of the quartz crystal. A plus direction of the electric axis (+X direction) is a direction of the electric axis generating plus electrical charge when pressure is added. The machine axis of the quartz crystal is an axis vertical to the optical axis of the quartz crystal and the electric axis of the quartz crystal. Note that, there are sometimes the electric axes of the quartz crystal, the machine axis of the quartz crystal and the optical axis of the quartz crystal are called as a X-axis of the quartz crystal, a Y-axis of the quartz crystal and the Z-axis of the quartz crystal.

In the present embodiment, the quartz crystal plate 18 is cut out from the quartz crystal 18a so that a face 181 crossing (substantially vertical) to the optical axis $\alpha$ (refer to FIG. 1) of the optical lens group 48 is being as an angle rotating $\theta$=+45' substantially by the counterclockwise from the optical axis (Z-axis) to the machine axis (Y-axis) as the electric axis (X-axis) is a center, viewing from the plus direction of the electric axis (+X direction).

Note that, in the present embodiment, the angle substantially +45° includes fluctuated angles from +45°. For example, if the fluctuation is +3° against the +45°, sufficient effects can be obtained. Further, the angle of $\theta$ is plus value means that an angle of clockwise direction to the arrow of the X-axis to the Z-axis, the angle of the opposite direction becomes minus value.

In the present embodiment, a quartz crystal plate 13 which constitutes one part of the optical member element 30 may be a flat plate cut out from the berg quartz crystal 18a so that $\theta$=substantially +45° from the berg quartz crystal 18a becomes a surface of the flat plate. However, it is preferable that a birefringence direction of the quartz crystal plate 13 differs 90° to the quartz crystal plate 18. This is in order to function as OPLF effectively and to protect the moire phenomenon.

The quartz crystal plate composed of a flat plate cut out from the berg quartz crystal 18a in a direction $\theta$=+45° differs an elastic coefficient and having lower bending rigidity, the resonant frequency is substantially 20% lower as compared from a quartz crystal plate composed of a flat plate cut out $\theta$=−45°.

A thickness of the quartz crystal plate 18 is designed as most appropriately corresponding to a pixel pitch of the image pickup element, for example, it is same thickness of the quartz crystal plate 13.

Figure 6A:
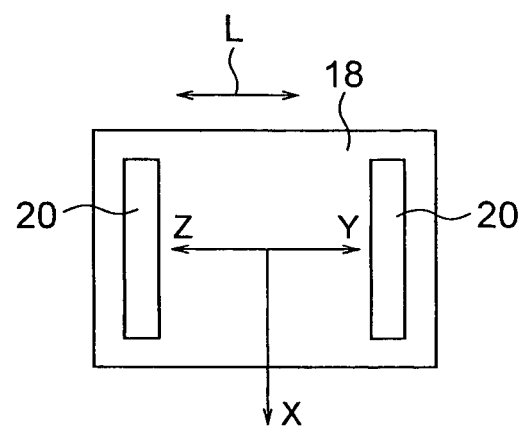
FIG. 6A to FIG. 6C are plain views for explaining relation of the crystal axis of the quartz crystal and the quartz crystal plate shown in FIG. 3 and FIG. 4.
Figure 6B:
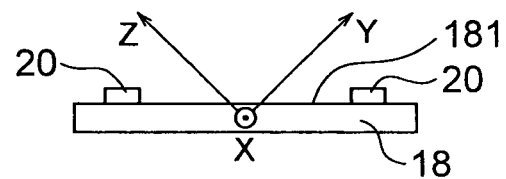
Figure 6C:
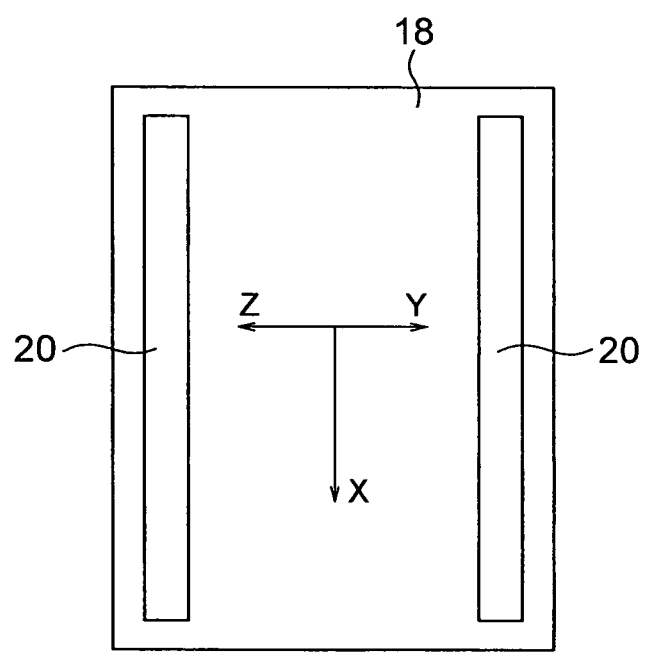

As shown in FIG. 6A and FIG. 6B, the quartz crystal plate 18 is cut out as a rectangular shape from the berg quartz crystal 18a shown in FIG. 5B, a short side direction of the rectangular shape becomes parallel to the X-axis of the berg quartz crystal 18a. A front surface and a back surface of the quartz crystal plate 18 become substantially 45° inclined surfaces to the Z-axis and the Y-axis.

As shown in FIG. 2, FIG. 3, FIG. 6A and FIG. 6B, a pair of piezoelectric elements 20 as vibration members are adhered on the front surface of the quartz crystal plate 18 (an outer face to the case 17) at both side position along the long side direction L of the rectangular quartz crystal plate 18 so as to extend parallel to the X-axis direction. The piezoelectric elements 20 are composed of, for example, PZT elements.

Figure 7A:
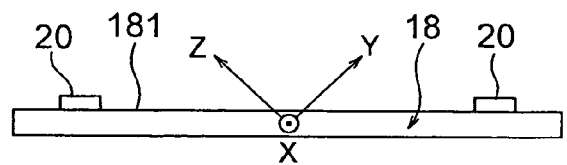
FIG. 7A to FIG. 7E are schematic views showing vibration mode.
Figure 7B:
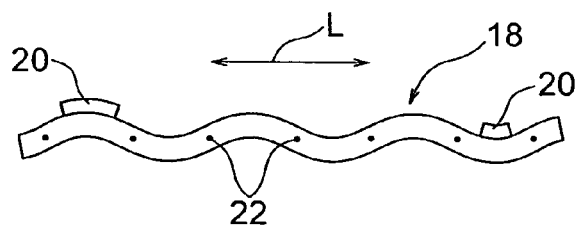
Figure 7C:
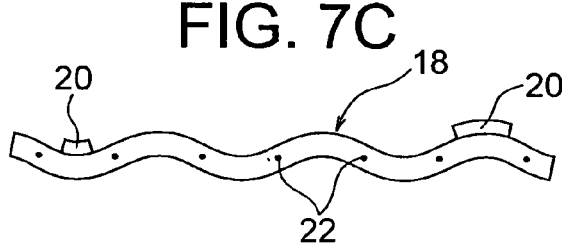
Figure 7D:
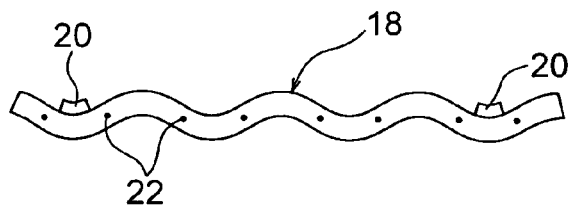
Figure 7E:
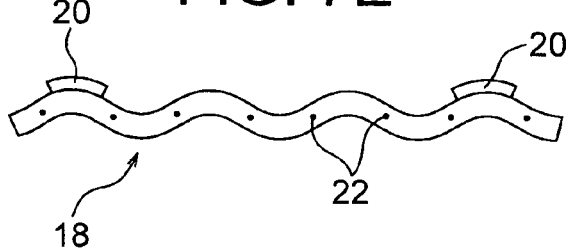
Figure 8:
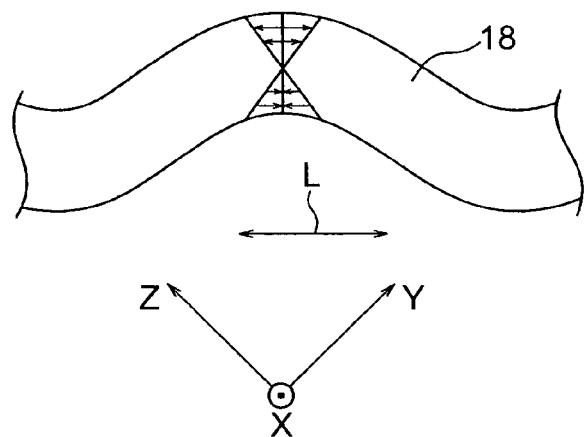
FIG. 8 is a schematic view showing a relation of distortion occurred at the quartz crystal plate and bending vibration.

Next, a vibration mode of the quartz crystal plate 18 by the piezoelectric element 20 will be specified mainly based on FIG. 7 and FIG. 8.

In the present embodiment, a signal is transmitted from the vibration mode selecting circuit 80 shown in FIG. 1 to the antidust filter driving circuit 56, for example as shown in FIG. 7B and FIG. 7C, to vibrate the quartz crystal plate 18 at a sixth bending vibration mode along with a longitudinal direction L (perpendicular to the X-axis) of the quartz crystal plate 18. There are seven nodes of the sixth bending vibration mode along the longitudinal direction L of the quartz crystal plate 18, and these nodes 22 become parallel to the X-axis. Positions of the vibration nodes 22 do not change when the vibration mode does not change as shown in FIG. 7B and FIG. 7C.

Also, in the case of changing the vibration mode, a signal is transmitted from the vibration mode selecting circuit 80 shown in FIG. 1 to the antidust filter driving circuit 56 so as to change the vibration mode. For example, by making the driving frequency is higher, as shown in FIG. 7D and FIG. 7E, the quartz crystal plate can be vibrated by a seventh vibrating mode along the longitudinal direction L of the quartz crystal plate 18.

In the seventh vibration mode, there are eight nodes along the longitudinal direction L of the quartz crystal plate 18, these nodes 22 become parallel to the X-axis. Positions of the nodes 22 do not change when the vibration mode does not change, as shown in FIG. 7D and FIG. 7E.

As shown in FIG. 7B to FIG. 7E, position of the nodes 22 at the quartz crystal plate 18 can be changed by changing the vibration mode. As a result of this, dust remained on the positions of node 22 on the surface of the quartz crystal plate 18 in a specific vibration mode will be blown away at other vibration mode at vibration acceleration, because the positions of node 22 are changed. As a result, it becomes available to remove the dust at whole surface area of the quartz crystal plate 18.

In the present embodiment, pressing member 19 shown in FIG. 2 to FIG. 4 is compressing quartz crystal plate 18 against a direction of the hermetic sealing member 16 from the outer face of the quartz crystal plate 18 at a position close to the nodes 22 positioned at the outer side of each of the piezoelectric elements 22 arranged at both sides of the longitudinal direction L of the quartz crystal plate 18. The pressing member 19 compresses the both sides of the longitudinal direction L of the quartz crystal plate along a direction parallel to the nodes 22 of the vibration only, does not compress both sides lying perpendicularly to the nodes 22 of the bending vibration at the quartz crystal plate 18. Because not to inhibit the bending vibration of the quartz crystal plate 18.

Note that, when the quartz crystal plate operates 18 the bending vibration in response to the driving frequency of the piezoelectric element 20, as shown in FIG. 8, pressure strain and tensile strain are occurred at an inside of the quartz crystal plate 18 to a plane surface direction of the quartz crystal plate 18 perpendicular to the X-axis (in the present embodiment, the longitudinal direction L of the quartz crystal plate 18).

In the image pickup element unit 4 according to the present embodiment, the quartz crystal plate 18 can be used as a part of the OLPS which contributes to reduce number of components and an apparatus to be compacted, because newly added members for dust removal are not necessary.

Also, as shown in FIG. 5A and FIG. 5B, the quartz crystal plate 18 having a surface of an angel substantially +45° to the Z-axis having different an elastic modulus, low bending rigidity and substantially 20% lower resonance frequency, as compared from a quartz crystal plate having a surface of an angle substantially −45° to the Z-axis. Therefore, the quartz crystal plate 18 of the present invention can be bent easily and includes high dust removability.

Figure 9:
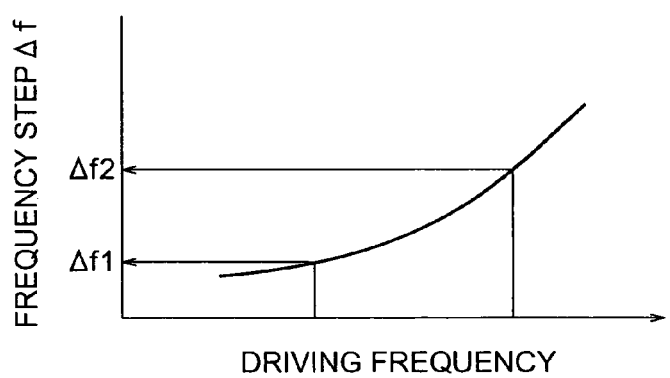
FIG. 9 is a graph showing a relation of vibration frequency and frequency step.
Figure 10:
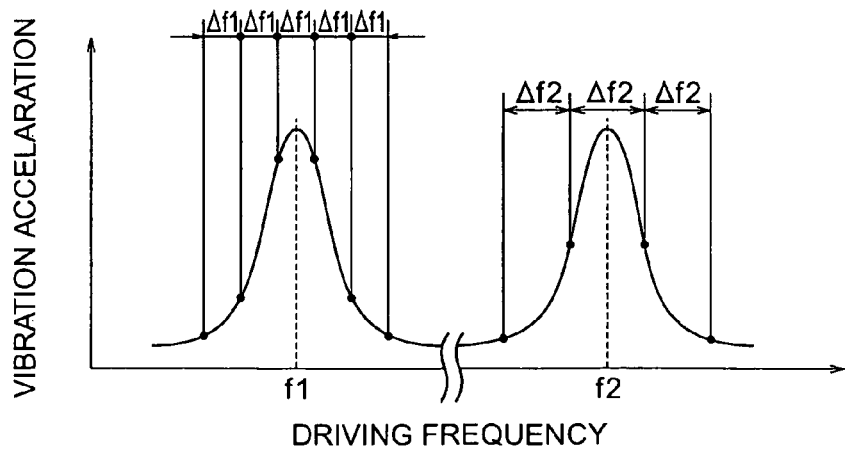
FIG. 10 is a graph showing a relation of driving frequency and vibration acceleration.

Also, an output frequency (driving frequency) to the piezoelectric element 20 can be lowered due to the quartz crystal plate 18 having the low resonance frequency. If the driving frequency can be lowered, e.g., in case that the driving frequency is changed in a stepwise fashion by using a clock frequency of a microcomputer, as shown in FIG. 9, lower driving frequency results in smaller frequency step Δf, for example, it is possible to reduce the frequency step from Δf2 to Δf1. As shown in FIG. 10, in a vibration mode in which the vibration acceleration becomes peak at high driving frequency f2, it is difficult to cause vibration at a frequency position where the vibration acceleration becomes peak due to a large width of the frequency step Δf2 are necessary.

Against this, as shown in FIG. 10, in a vibration mode in which the vibration acceleration becomes peak at lower driving frequency f1, it can easily be vibrating at a position near the frequency position where the vibration becomes peak due to narrowing a width of the frequency step Δf1 is available. Also, in the present embodiment, design and producing a vibration circuit becomes easily available due to the lower frequency.

Further, in the present embodiment, since the quartz crystal plate 18 is a rectangular shape and the image pickup element 12 is a rectangular shape, it contributes that an apparatus to be compacted due to a space where that the quartz crystal plate 18 for the dust prevention is small, compared from a circular shape glass.

Furthermore, in the present embodiment, the one side quartz crystal plate 18 which constitutes a part of OPLF is provided to the optical member element 30 of OPLF except for the quartz crystal plate 18 with predetermined intervals which corresponds to a thickness of the hermetic sealing member 16. Therefore, as compared from the case of vibrating whole OPLF including the quartz crystal plate 18 and the optical member element 30, the dust prevention effect is further increased and contributes to energy saving by making vibration only the quartz crystal plate 18, because it is becomes available to increase vibration acceleration with lower applied energy.

More further, in the present embodiment, since the dust removal function is exerted by using the bending vibration of the quartz crystal plate 18 (driving frequency is tens of kHz to several hundreds of kHz) and not by vibration of a surface elasticity wave of the quartz crystal plate (driving surface is several MHz), it is superior in the dust prevention effect.

Note that, the present invention is not limited to the above explained embodiment and can be modified within a scope of the present invention.

For example, in the above mentioned embodiment, as shown in FIG. 6A and FIG. 6B, although the quartz crystal plate 18 is a rectangular shape and its short side is substantially parallel to the X-axis, the long side of the rectangular shape may be parallel to the X-axis. Also, in the above embodiment, a pair of the piezoelectric elements 20 is provided on both sides of the long side direction of the quartz crystal plate 18 of the rectangular shape, it may be provided on both sides of the short side direction.

Also, in other embodiment, it may be constituted that the piezoelectric elements 20 are adhered to a back surface of the quartz crystal plate 18 at both side edges of the longitudinal direction L in the quartz crystal plate 18, by enlarging a width of the longitudinal direction L of the quartz crystal plate 18 than the case 17 shown in FIG. 2 to FIG. 3.

Figure 11A:
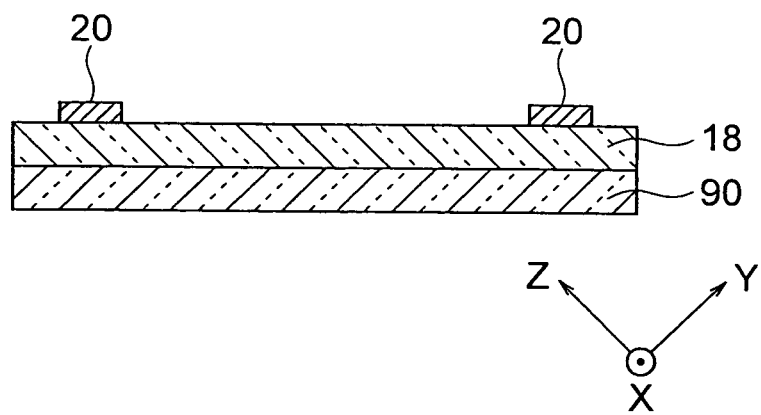
FIG. 11A, FIG. 11B and FIG. 12 are main section cross sectional views according to other embodiments of the present invention.
Figure 11B:
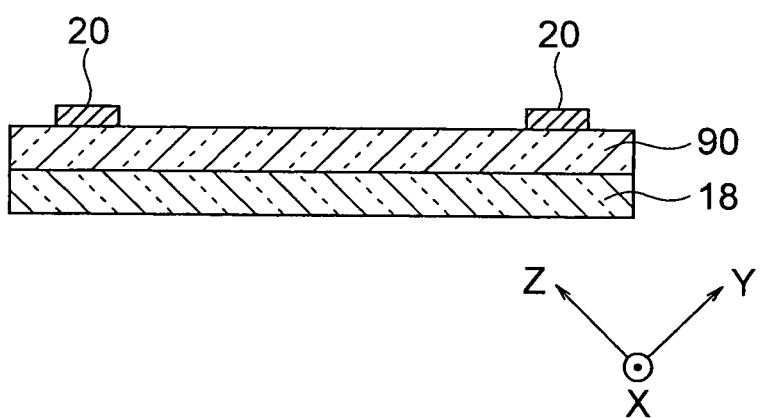

Further, in other embodiment, the bending vibration may be made as shown in FIG. 7B to FIG. 7E, by constituting an optical member plate integrally with a light transmissive plate 90 and the quartz crystal plate 18 which is shown in FIG. 11A and FIG. 11B. As the optical member plate, although it is not particularly limited, it is composed of, e.g., a glass plate or other optical property plate and the like. Although a thickness of the light transmissive plate 90 is not particularly limited, a thickness less than that of the quartz crystal plate 18 is preferable.

As means for integrating the quartz crystal plate 18 and the light transmissive plate 90, although it is not particularly limited, for example, adhesion is exemplified. Although the piezoelectric elements 20 may be adhered on the surface of the quartz crystal plate 18, it may be adhered on a surface of the light transmissive plate 90.

Figure 13:
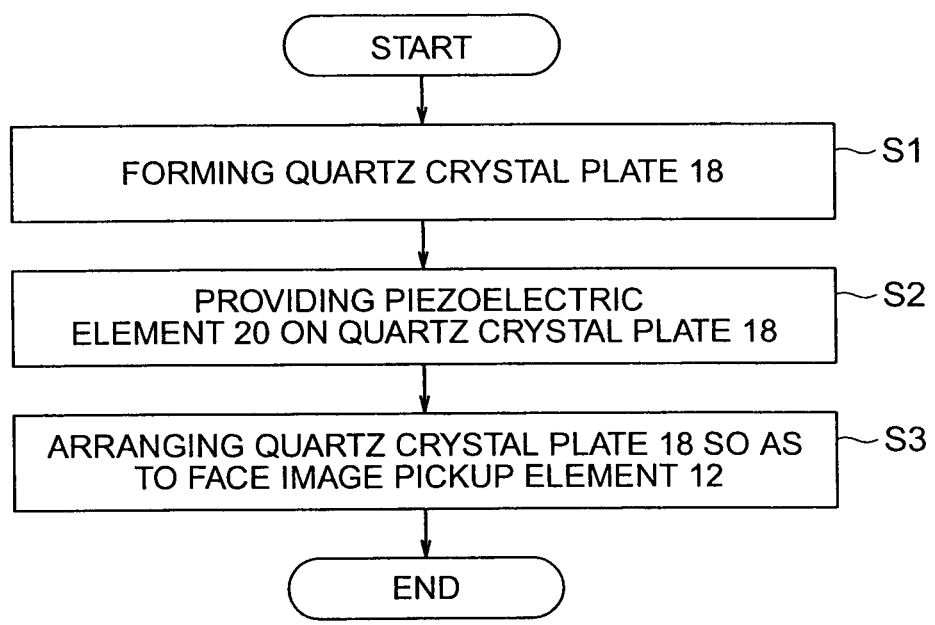
FIG. 13 is a flow chart showing a manufacturing method for an imaging device according to one embodiment of the present invention.

Although a method for manufacturing the imaging device according to the above mentioned first embodiment is not particularly limited, for example, as shown in FIG. 13, it may be manufactured as following steps. Firstly, the quartz crystal plate is formed in a step S1. As mentioned above, it is preferable to cut out the quartz crystal plate 18 at a predetermined angle. Next, in a step S2, piezoelectric element 20 is fixed to the quartz crystal plate 18. For fixing the quartz crystal plate 18 and the piezoelectric element 20, as shown in following mentioned a second embodiment, it is preferable to use UV curable epoxy adhesive or cationic polymerization UV curable adhesive. Next, in a step S3, the quartz crystal plate 18 is arranged so as to face the image pickup element 12.

Second Embodiment

A second embodiment of the present invention is a modified version of the above mentioned first embodiment, and includes similar constitution, function and effects of the first embodiment.

Figure 12:
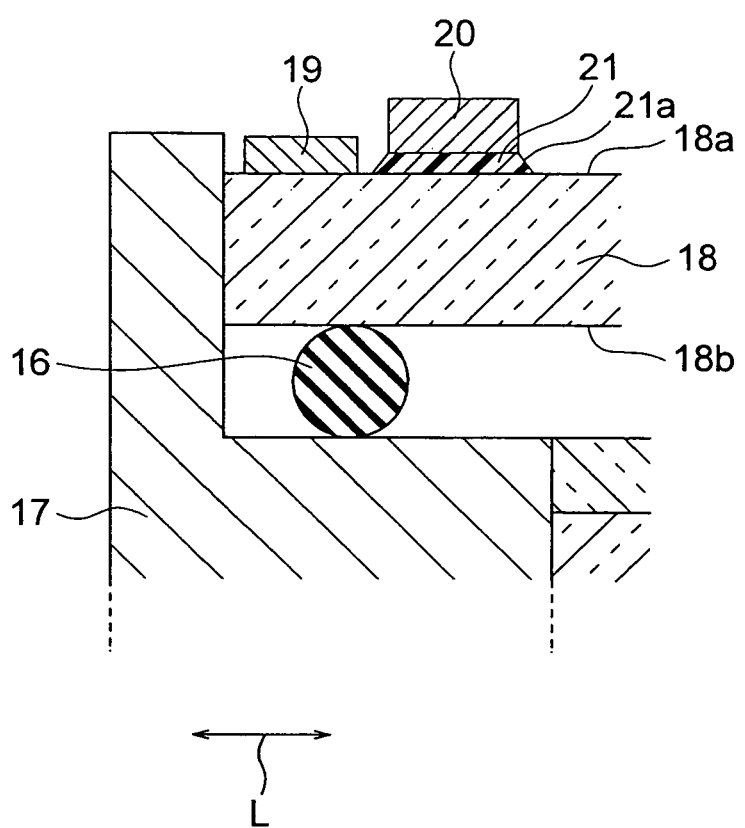

In the present embodiment, as shown in FIG. 12, the piezoelectric element 20 is fixed on an external surface 18*a* of the quartz crystal plate 18 by UV curable epoxy adhesives. Namely, on the external surface of the quartz crystal plate 18*a*, a hardening layer 21, which is the UV curable epoxy adhesives cured, is formed between the piezoelectric elements 20. In this manner, the piezoelectric member 20 is fixed by the hardening layer 21 to the external surface 18*a* of the quartz crystal plate 18.

Since the UV curable epoxy adhesive includes smaller shrinkage compared from, for example, acrylic adhesives and the like, therefore, the piezoelectric element 20 can be adhered accurately. Further, in the present embodiment, since the UV curable epoxy adhesive having good surface hardenability, the adhesive is cured sufficiently at an excess part 21*a* of the hardening layer 21 excesses from an adhering surface of the piezoelectric element 20 and the quartz crystal plate 18. Therefore, in the image pickup element unit according to the present embodiment, uncured adhesives remains on the excess part and the like do not flow at the time of cleaning maintenance and the like of the quartz crystal plate 18 and contamination of the quartz crystal plate 18 is prevented.

Also, since the UV curable epoxy adhesive is used, the piezoelectric element 20 can be easily adhered by irradiating UV from a sealing face 18*b* side of the quartz crystal plate 18. Further, in the present embodiment, since the UV curable adhesive is used, a thermal load received by the quartz crystal plate at the time of adhering is inhibited compared in case that a thermal curable adhesive is used.

The UV curable epoxy adhesive used in the present embodiment may include colorant to color the UV curable epoxy adhesive. In case that the colorant is included in the UV curable epoxy adhesive, the hardening layer 21 is also colored. Therefore, it is available to recognize a shape of the hardening layer 21 and bubbles exist in the hardening layer 21 and the like comparatively easily by observing the hardening layer 21 from the sealing face 18*b* side of the quartz crystal plate 18, even after adhesion of the piezoelectric element 20. Thus, inspection of adhesion condition of the piezoelectric element 20 and the quartz crystal plate 18 can be made easily.

Also, by coloring the hardening layer 21, it is available to prevent unnecessary reflection occurred by the hardening layer 21, deterioration of an image taken according to the light reflected by the hardening layer as well as to prevent contamination of the unnecessary image to the image to be taken. Further, the hardening layer 21 to which the colorant included may cover at least one portion of the piezoelectric element 20. Thereby, it is available to prevent unnecessary reflection occurred by the piezoelectric element 20, deterioration of an image taken according to the light reflected by the hardening layer as well as to prevent contamination of the unnecessary image to the image to be taken.

Furthermore, a cleaning area 32 shown by a two-dot chain line in FIG. 2 is provided on the external surface 18*a* of the quartz crystal plate 18 according to the present embodiment. The cleaning area 32 is formed as including at least an area corresponding to the image pickup element 12 of the external surface 18*a*.

At the time of assembling a camera and user maintenance, cleaning is operated for removing dust adhered on the cleaning area 32 by compressing and wiping with a cleaning paper to which solution such as alcohol and the like are included. By operating the cleaning operation with using solution to the quartz crystal plate 18, it is possible to remove the dust which cannot be removed with the quartz crystal plate 18 vibration by the piezoelectric element 20.

In the quartz crystal plate 18 according to the present embodiment, both edge portions of the longitudinal direction L of the cleaning area 32 contact with the piezoelectric elements 20, the cleaning area 32 is formed as it includes an area which corresponds to the optical member element 30. It is preferable to make the cleaning area 32 is a sufficiently wide area compared from an area corresponding to the image pickup element 12. Thereby, unwanted reflections of dust to the image pickup element 12 can be prevented certainly. Note that, the cleaning area 32 may include at least an area corresponding to the image pickup element 12. For example, it may be whole area of the external surface 18*a* except for contact faces of the hardening layer 21 and the pressing member 19.

Here, at the time of operating the cleaning operation of the external surface 18*a* of the quartz crystal plate 18 with using solution, there is a case that the solution to be used for the cleaning operation contacts to the hardening layer 21. In this case, in a conventional art in which acryl adhesion is used to fix the piezoelectric element, a problem that, the quartz crystal plate is contaminated with leaked out adhesion hardening material at the time of contact with the solvent, is likely occurred, because solvent resistant of the acryl adhesion is poor.

Further, in the conventional art, there will be a problem occurrence that the hardening material is leaked out which causes reducing adhesion force or unstuck the piezoelectric element, when the hardening material of the adhesive contacts to the solvent. However, in the present embodiment, since the hardening layer 21 is constituted by the UV curable epoxy adhesion having good solvent resistant, the hardening layer 21 will not be leaked out even the hardening layer 21 contacts with the solvent. Therefore, in the image pickup element unit 4 according to the present embodiment, the contamination of the quartz crystal plate 18 originated from the leak out of the hardening layer 21, reducing the adhesion force of the piezoelectric element 20 or unstuck the piezoelectric element 20 and the like can be prevented.

In this manner, in the image taking element unit 4 according to the present embodiment, because the UV curable epoxy adhesive is used, it is possible to bond the piezoelectric element 20 to the external surface 18*a* to which the cleaning area 32 is formed, with keeping high adhesion reliability and maintenance property.

Note that, in the present embodiment, although the UV curable epoxy adhesive is used as adhesive for bonding the piezoelectric element 20 to the quartz crystal plate 18, cationic polymerization UV curable adhesive having proton acid as active species may be used as other embodiments. The cationic polymerization UV curable adhesive may be used as adhesive for bonding the piezoelectric element 20 to the quartz crystal plate 18 as similar to the UV curable epoxy adhesive. Even when the cationic polymerization UV curable adhesive is used, the above mentioned similar effects by using the UV curable epoxy adhesive can be obtained as compared from the conventional arts.

Also, in the above mentioned embodiment, the piezoelectric element 20 is bonded on a surface of the quartz crystal plate 18 via the hardening layer 21, it is not limited thereto. As shown in FIG. 11B, the piezoelectric element 20 may be adhered to the light-transmissive plate 90 which is integrated with the quartz crystal plate 18 via the hardening layer 21. Alternatively, the piezoelectric element 20 may be adhered on a surface of a unity layer or plural layer of light transmissive plate which is not the quartz crystal plate 18 via the hardening layer 21.

Third Embodiment

A third embodiment of the present invention is a modified version of the above mentioned first embodiment and the second embodiment, and includes functions and effects as similar with the first embodiment other than specified below.

In the present embodiment, an optical anisotropic plate 18 composed of lithium niobate is used instead of the quartz crystal plate 18 in the first embodiment and the second embodiment. Because the optical anisotropic plate 18 composed of lithium niobate includes equivalent or better birefringence properties with respect to the quartz crystal plate 18, it may be used at least one part of OLPF.

Also, the optical anisotropic plate 18 composed of lithium niobate includes mechanical anisotropy, and there is a direction which generates bending vibration easily to a crystal axis. Thus, as similar with the first embodiment, the bending vibration shown in FIG. 7B to 7E may be generated easily by cutting a crystal body of lithium niobate in the easily bending vibration direction.

Fourth Embodiment

Figure 14A:
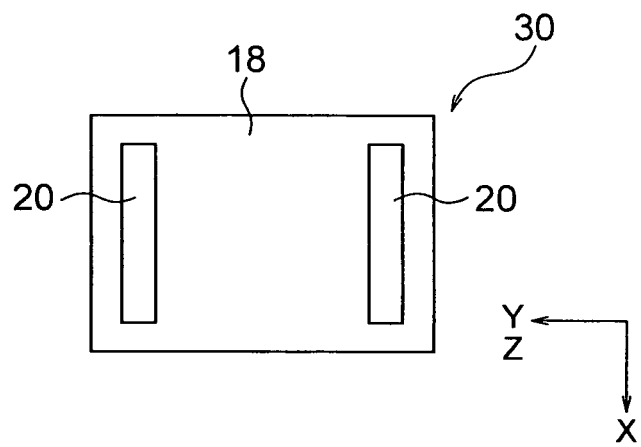
FIG. 14A is a plane view of an optical anisotropic plate used for an imaging device according to other embodiment of the present invention.
Figure 14B:
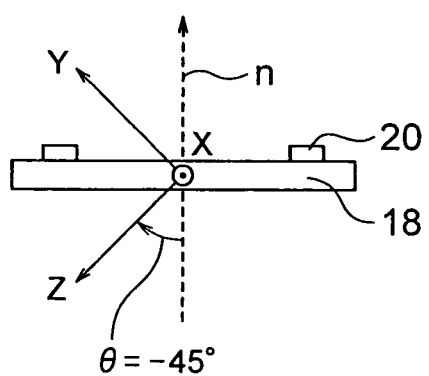
FIG. 14B is a side view of the optical anisotropic plate shown in FIG. 14A.

FIG. 14A and FIG. 14B shows an optical member 30 using an optical anisotropic plate including lithium niobate. The optical member comprises the optical anisotropic plate 18 including the lithium niobate and the piezo elements 20 mounted to the optical anisotropic plate 18.

As shown in FIG. 14B, the optical anisotropic plate 18 is composed to locate at a position where a Z-axis rotates −45° around a X-axis to a normal direction n of the optical anisotropic plate 18.

In an embodiment shown in a drawing, XYZ axes which define a direction of the optical anisotropic plate 18 including lithium niobate is determined by a direction of elastic modulus shown in FIG. 15. In FIG. 15, $C_{33}$ (Z direction elastic modulus) is $2.424 \times 10^{11}$ N/m², C11 (X, Y directions elastic modulus) is $2.030 \times 10^{11}$ N/m², and $C_{33}$ (Z direction elastic modulus) is larger than C11 (X or Y direction elastic modulus).

Figure 16A:
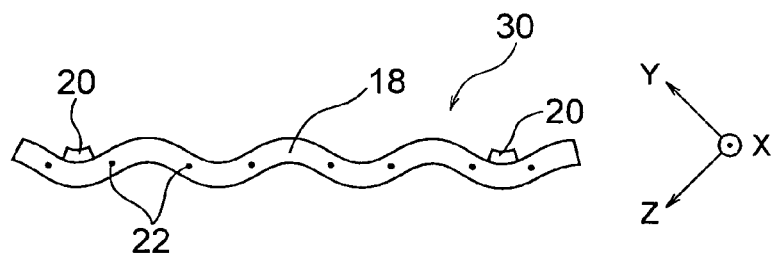
FIG. 16A and FIG. 16B shows vibration status of an optical anisotropic plate.
Figure 16B:
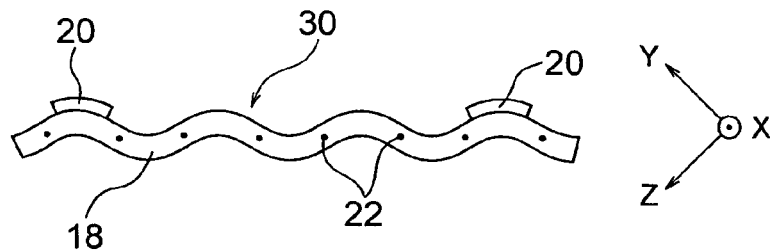

FIG. 16A and FIG. 16B shows vibration status of the optical member 30. In FIG. 16A and FIG. 16B, the optical anisotropic plate is driven by the piezo elements 20 and acts bending vibration so as to generate nodes of vibration.

Figure 17:
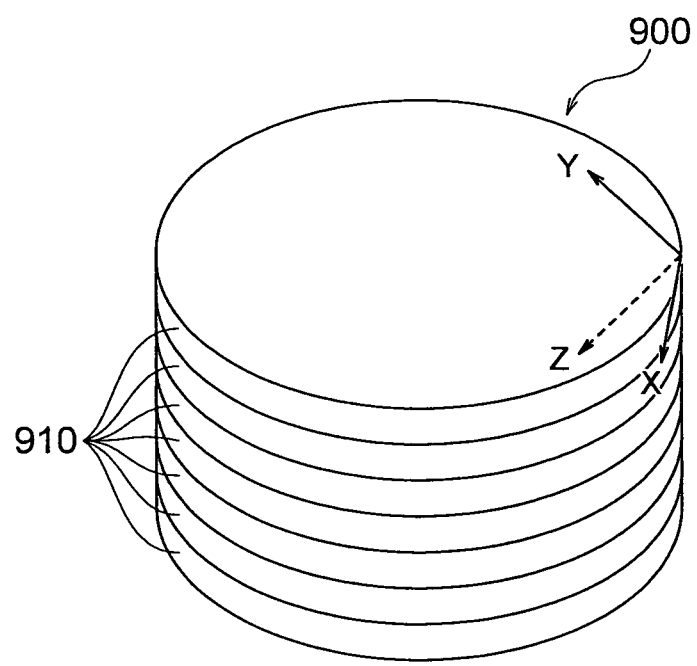
FIG. 17 is a schematic view showing an ingot from which an optical anisotropic plate is cut out.
Figure 18:
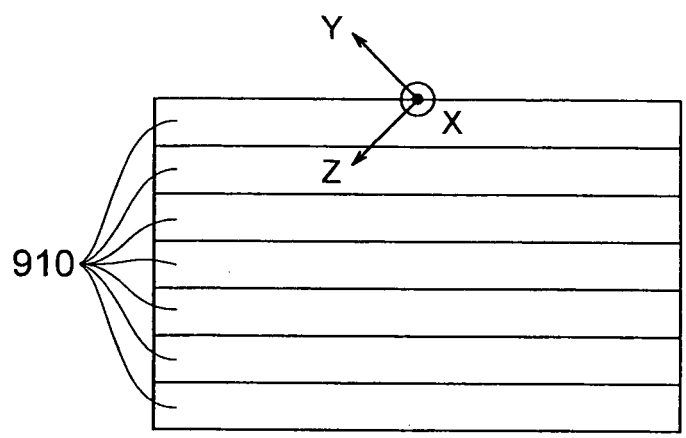
FIG. 18 is a side view of the ingot.
Figure 19:
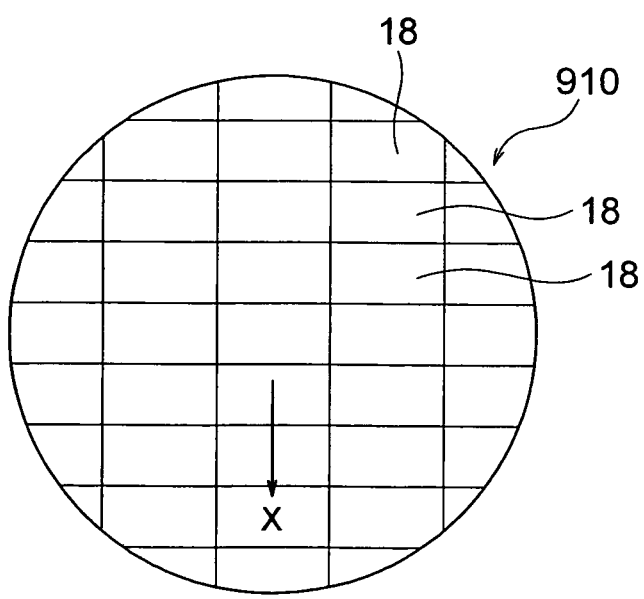
FIG. 19 is a plane view of the ingot.

As shown in FIG. 17 to FIG. 19, the optical anisotropic plate composed by lithium niobate can be obtained, for example, by cutting out from an ingot 900 of lithium niobate. Specifically, at first, wafers 910 are sliced from the ingot 900 shown in FIG. 17 and 18. Next, the wafers shown in FIG. 19 are cut by a dicing machine and the like, the optical anisotropic plate 18 can be obtained.

In the present embodiment, since the optical anisotropic plate 18 composed of lithium niobate is used, a refractive index difference of an ordinary ray and an extraordinary ray becomes larger, as compared from in case of using an optical anisotropic plate of the quartz crystal. Thus, a necessary thickness for obtaining a predetermined split width requires far thinner than the optical anisotropic plate of the quartz crystal and making low profile of device can be achieved by the optical anisotropic plate composed of lithium niobate 18.

Figure 20:
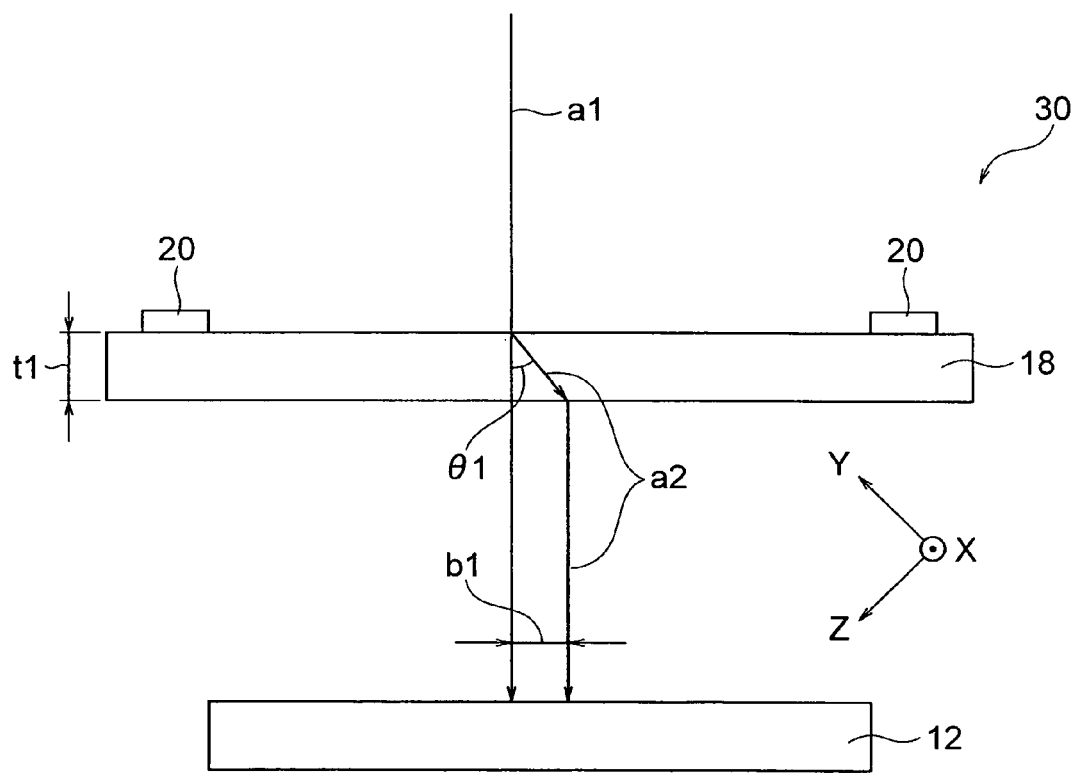
FIG. 20 is a schematic view showing an optical property of an optical anisotropic plate.

FIG. 20 shows optical properties of the optical anisotropic plate 18. In FIG. 20, an ordinary ray a1 which vibrates vertical to a plane of paper and an extraordinary ray a2 which vibrates parallel to the plane of paper and vibrates vertical to the moving direction are entered into the optical anisotropic plate 18. The extraordinary ray a2 emits from the optical anisotropic plate 18 with only retracting at an angle θ1 to the ordinary ray a1 and incidents into an image pickup element 12. The angle θ1 becomes larger in the case of a lithium niobate base plate than a quartz crystal base plate. Consequently, a large split width b1 may be obtained at a larger amount of the angle θ1 by the optical member 30 shown in FIG. 20.

Also, since the optical member 30 of the present embodiment uses an optical anisotropic plate which is cutout to a direction shown in FIG. 14A and FIG. 14B, a bending rigidity when the optical member 30 is driven so as to generate nodes 22 parallel to the X-axis shown in FIG. 16A and FIG. 16B becomes lower, it is possible to remove the dust well.

Figure 21A:
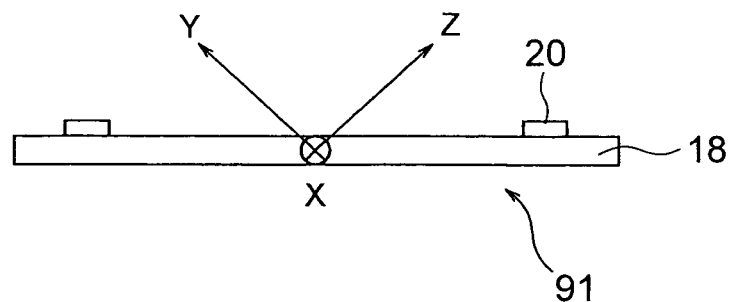
FIG. 21A to FIG. 21C are side views of optical anisotropic plates according to comparing examples of the present invention.
Figure 21B:
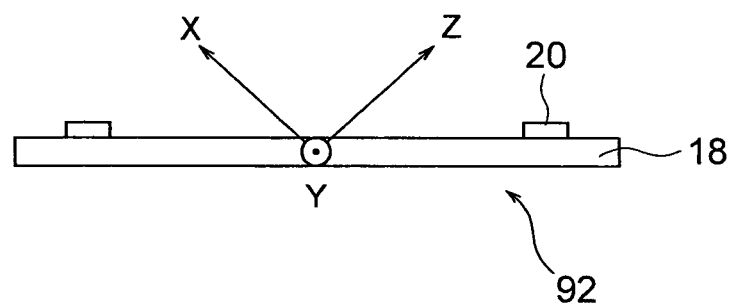
Figure 21C:
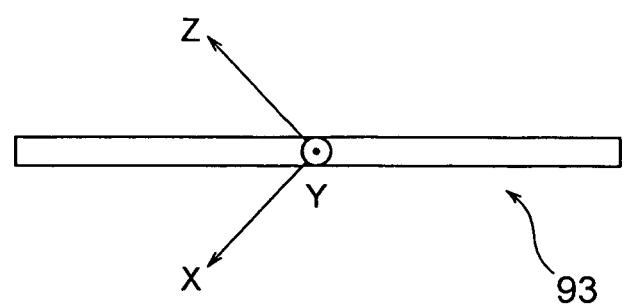

FIG. 21A to FIG. 21C show optical members 91 to 93 according to comparative examples of the present invention. The optical members 91 to 93 of the comparative examples are that cutting directions thereof are different from the optical anisotropic member 30 of the present embodiment shown in FIG. 14a and FIG. 14B, and have high bending rigidity than the optical member 30 of the present embodiment.

Note that, in the above mentioned the first to the fourth embodiments, although it is specified by using an imaging device to operate image blurring compensation by moving image pickup element, it is not limited thereto. For example, it may be an imaging device to operate image blurring compensation by moving a lens, and it may be an imaging device having no image blurring compensation function.

Also, for example, an optical member plate may be composed by that an optical transparent plate is integrated into the optical anisotropic base plate 18. Because, by integrating the optical transparent plate 90 into the optical anisotropic base plate 18, the rigidity becomes higher than the optical anisotropic base plate 18 as a single body. For example, although in case that the optical anisotropic base plate 18 as a single body is thin and lower rigidity, a high rigidity may be obtained in a status that an optical member plate is integrated into the optical transparent plate 90.

Similarly, an optical member plate may be constituted by integrating the optical anisotropic base plate 18 into the optical transparent plate 90 with using the optical anisotropic base plate 18 including lithium niobate of the fourth embodiment instead of the quartz crystal plate shown in FIG. 11B. Because the rigidity becomes higher than the single optical anisotropic base body 18 by integrating the optical anisotropic base plate 18 into the optical transparent plate 90.

Constitutions of the first to fourth embodiment may be modified suitably. Also, at least one portion of the constitution of the first embodiment may be combined with at least one of the constitutions of the second to fourth embodiment, at least one portion of the constitution of the second embodiment may be combined with at least one of the constitutions of the first, third and fourth embodiment, at least one portion of the third embodiment may be combined with at least one of the constitutions of the first to second and fourth embodiment.

The invention claimed is:

1. An imaging device comprising:
a quartz crystal plate being rectangular and including a quartz crystal of a crystal structure having a first axis which is a crystal growth axis and a second axis which is an electric axis perpendicular to the first axis, said quartz crystal plate being provided to face an image pickup element that takes an image from an optical system,
a vibration member provided on a surface of said quartz crystal plate, the surface crossing an optical axis of said optical system, to generate bending vibration at said quartz crystal plate, and
a drive portion which drives said vibration member to generate a plurality of vibration nodes in a substantially straight line, the line is substantially parallel to a side of said quartz crystal plate, wherein
an angle of a face of said quartz crystal plate crossing the optical axis of said optical system is substantially rotated +45° counter-clockwise around said second axis from said first axis, if viewed from said second axis.

2. The imaging device as set forth in claim 1, wherein said quartz crystal plate is a flat plate cut-out from the quartz crystal in a direction having birefringence of light.

3. The imaging device as set forth in claim 1, wherein the face of said quartz crystal plate crossing the optical axis of said optical system is substantially parallel to said second axis of said quartz crystal.

4. The imaging device as set forth in claim 1, wherein a short side of said rectangular quartz crystal plate is substantially parallel to said second axis of said quartz crystal.

5. The imaging device as set forth in claim 1, wherein a long side of said rectangular quartz crystal plate is substantially parallel to said second axis of said quartz crystal.

6. The imaging device as set forth in claim 1, wherein said vibration member is configured to generate distortion on said quartz crystal plate in a direction substantially perpendicular to the second axis of said quartz crystal.

7. The imaging device as set forth in claim 6, wherein said drive portion drives said vibration member to generate bending vibration so that the line of the plurality of vibration nodes becomes substantially parallel to the second axis of said quartz crystal.

8. The imaging device as set forth in claim 1 further comprising:
an ultraviolet curable epoxy adhesive provided between said quartz crystal plate and said vibration member to fix said quartz crystal plate and said vibration member together.

9. The imaging device as set forth in claim 1 further comprising:
a cationic polymerization type ultraviolet curable adhesive provided between said quartz crystal plate and said vibration member to fix said quartz crystal plate and said vibration member together.

10. The imaging device as set forth in claim 1 further comprising:
vibration mode selecting means which changes a vibration mode of said quartz crystal plate by said vibration member.

11. An optical device comprising the imaging device as set forth in claim 1.

12. The imaging device as set forth in claim 1, wherein said vibration member includes
a first vibration member being provided substantially parallel to and adjacent to a first side of said quartz crystal plate, and
a second vibration member being provided substantially parallel to and adjacent to a second side which is parallel to said first side of said quartz crystal plate.

13. The imaging device as set forth in claim 1 further comprising:
a support member supporting said quartz crystal plate and being provided substantially parallel to said vibration member and said line of the plurality of vibration nodes.

14. The imaging device as set forth in claim 13, wherein said support member has a pressing member which compresses said quartz crystal plate.

15. The imaging device as set forth in claim 13, wherein said support member is provided closer to said side of said quartz crystal plate than said vibration member, and
said drive portion drives said vibration member to generate a vibration node adjacent to said support member.

16. A method for manufacturing an imaging device comprising steps of:
providing a vibration member which vibrates a quartz crystal plate at a face of said quartz crystal plate, the face crossing an optical axis of an optical system, said quartz crystal plate having a crystal structure and including a first axis which is a crystal growth axis and a second axis which is an electric axis perpendicular to said first axis, and
arranging said quartz crystal plate to face an image pickup element that takes an image from said optical system, wherein
an angle of a face of said quartz crystal plate crossing the optical axis of said optical system is substantially rotated +45° counter-clockwise around said second axis as a center axis from said first axis, if viewed from said second axis.

17. The method for manufacturing an imaging device as set forth in claim 16, wherein
the face of said quartz crystal plate crossing the optical axis of said optical system is substantially parallel to said second axis of said quartz crystal plate.

18. An imaging device comprising:
a quartz crystal plate including a quartz crystal of a crystal structure having a first axis which is a crystal growth axis and a second axis which is an electric axis perpendicular to the first axis, said quartz crystal plate being provided to face an image pickup element that takes an image from an optical system, and
a vibration member provided on a surface of said quartz crystal plate, the surface crossing an optical axis of said optical system, to vibrate said quartz crystal plate, wherein
an angle of a face of said quartz crystal plate crossing the optical axis of said optical system is substantially rotated +45° counter-clockwise around said second axis from said first axis if viewed from said second axis.

* * * * *